Patented July 4, 1939

2,164,936

UNITED STATES PATENT OFFICE 2,164,936

PROCESS FOR THE SEPARATION OF INVERTASE

Glennard E. Miller, New York, and Robert F. Light, Mount Vernon, N. Y., assignors to Standard Brands Incorporated, New York, N. Y., a corporation of Delaware No Drawing. Application March 12, 1937, Serial No. 130,510

5 Claims. (Cl. 195—68)

The invention relates to an invertase preparation and to a method for its production. More particularly, it relates to a method for the stabilization of invertase preparations and includes correlated improvements and discoveries whereby the qualities of such preparations are enhanced.

Yeast has been known for a long time as a principal source of invertase, and many methods have been proposed for its separation. Among the methods proposed may be mentioned that of Hudson (J. Am. Chem. Soc., vol. 36, page 1566), by means of which a comparatively weak invertase was obtained by dialysis; that of Reynolds (Ind. Eng. Chem., vol. 16, page 169), involving ultra-filtration by means of a colloid membrane, and that of Willstaetter (Zeit. Physiol. Chem., vol. 116, page 53) in which specially prepared alumina or other materials were used to adsorb the invertase, which was followed by elutriation. These methods all utilize procedures which are intrinsically expensive and which are involved to an extent such that a commercial separation of invertase is impracticable.

It is an object of this invention to provide an improvement in a process for the preparation of invertase, that does not require either dialysis, ultra-filtration, adsorption or elutriation, and hence that is free from such costly procedures.

A further object of the invention is to provide a process in accordance with which invertase may be obtained from yeast efficiently on a commercial scale and at a low production cost.

Another object of the invention is to provide a process which gives a solution of invertase directly from yeast and in the preparation of said solution the invertase is protected from the deteriorating influence of metals in acid solution.

Other objects of the invention will in part be obvious and will in part appear hereinafter.

The invention accordingly comprises the several steps and the relation of one or more of such steps with respect to each of the others and the enzyme product having the features and properties which are exemplified in the following detailed disclosure and the scope of the invention will be indicated in the claims.

In the practice of the invention, invertase which is a colloid enzyme and closely held within the cells of yeasts, may be separated from the enclosing cell tissue at a suitable pH by killing the yeast cells and allowing the yeast to undergo autolysis at a temperature of 25–35° C., preferably in the presence of an alkaline material. The autolyzed mass may then be filtered, desirably after dilution and the addition of a filtering aid, e. g., kieselguhr, "Filter-Cel", etc., and the filter cake so obtained thoroughly washed. The filter cake is discarded. To the filtrate containing invertase there is now added an agent which protects the invertase from deteriorating effects of metals, e. g. copper, iron and the like in the presence of acid, and then it is acidified by means of a mineral acid, as phosphoric, hydrochloric, sulfuric, and preferably with the addition of a small percentage of a decolorizing carbon. A precipitate is formed consisting principally of yeast protein and, after standing for a period which may be several hours, the precipitated material and the carbon are separated from the liquid. The filtrate thus obtained is reacted with an antacid substance, for example, calcium carbonate, magnesium carbonate, sodium carbonate, etc., until the solution has a pH value of about 4.5 to 6 or 6.5. Preferably, the antacid substance is one which is insoluble in water and which is added in excess. When an excess is added, the mixture is filtered and the solution degasified as by aeration effected by passing a current of air therethrough.

The invertase preparation produced in the foregoing manner is one of good color, viz. colorless to amber, of high activity, i. e. having an inverting value of K. 25 to K. 8, and of good keeping qualities, such that when retained at a temperature of about 37° C. for about 70 days the decrease in activity is substantially not more than 3%, and does not require evaporation to place it in suitable condition for marketing and commercial use. The protective agent may be a polyhydric organic compound, and more particularly and for example, ethylene glycol, glycerine, mannitol, cane sugar and erythrol. We have found that a filtrate to which a polyhydric compound, as glycerine, has been added in an amount of from about 20%–70%, preferably about 50%, based upon the final volume of the invertase preparation possesses satisfactory stability with respect to metals in acid solution. A filtrate thus treated may be processed in usual containers and presses without marked decrease in invertase activity. This is especially so in solutions of relatively high acidity, e. g., having a pH value of about 3.5–4.

As an illustrative embodiment of a manner in which the invention may be practiced, the following description is presented. In order to release invertase from yeast, it is necessary first to kill the yeast cells, whereupon a freeing of the enzyme may be accomplished by autolysis of the yeast which then takes place. Killing of the yeast may be accomplished by mixing therewith about 2–3% of toluene. Preferably, there is also admixed a small amount, about 0.5 to 2.0% of an alkaline reacting material, e. g., sodium carbonate. The mixture is allowed to undergo autolysis at a temperature of about 30° C. for a period of several days, then the mass is diluted with about 70% of water or of an invertase containing filtrate obtained in a previous filtering operation, about 20% of kieselguhr added, and the mass filtered. The filter cake so obtained is then, preferably, mixed with a weak invertase containing filtrate resulting from a filtering operation in the processing of a previous batch, again filtered and, if desired, the filter cake mixed with water and this mixture subjected to filtration.

The filtrates, other than the first one, may be, and are preferably used as above indicated for diluting, and, for extracting invertase from the filter cake of the first separation, that is, immediately following autolysis. The filtrate obtained as a result of separating solids from the liquid is admixed with glycerine in an amount of about 50% based upon the final volume of the invertase containing solution. It then may be strongly acidified to a pH 4.5 to 3.5 by the addition of phosphoric acid, or other suitable inorganic acid, and, more particularly, 85% phosphoric acid diluted in the ratio of 1–5. The addition of acid is desirably made as a thin stream with constant stirring. During the acidification treatment there may preferably be added a small amount of a suitable decolorizing carbon, such as "Darco" "Norit", in an amount of about 1%. A precipitate, which consists substantially of yeast protein, immediately forms, which increases in amount upon standing. After a period of several hours the precipitate and the added carbon are removed by filtration.

The acidity of the filtrate, if desired, may be reduced to a value of pH 4.5 to 6 by adding powdered calcium carbonate thereto in excess. The mixture is stirred for a period sufficient to give the desired reaction with the calcium carbonate when the excess is removed by filtering, and the filtrate subjected to aeration with a current of air in order to remove the carbon dioxide dissolved therein. The invertase preparation thus produced is possessed of high activity and is suitable for marketing without further concentration. It is, however, sometimes desired that the preparation have a definite activity so that the formulas in connection with which it may be used will not vary. When such is desired, the activity may be adjusted to the proper value by measuring the inverting power upon a standard solution of cane sugar, and then adding, if necessary, a stronger or weaker invertase solution to give the proper degree of activity.

The foregoing procedure yields an invertase preparation suitable for commercial purposes, but inasmuch as yeast, particularly autolyzed yeast, is a highly perishable biological product, which spoils readily unless proper precautions are taken, it is desirable that the process be carried through without undue delay and in thoroughly clean apparatus.

Further, we have demonstrated the effectiveness of the protective agent, for preventing deterioration of invertase activity in the presence of acid and of metals, by experiments in which an invertase solution containing 50% glycerine was acidified to a pH of 3.5 and 4 and retained in glass and in copper vessels. The solution acidified to a pH of 3.5 in copper had an inverting value of $K=0.175$. The same solution in glass gave an inverting value of $K=0.170$. When the invertase solution was acidified to a pH of 4.0 and retained in copper the inverting value was $K=0.174$, and when retained in glass the value was $K=0.171$. This solution without acidification had an inverting value of $K=0.179$. These results show that when an invertase solution contains a protective agent, specifically 50% glycerine, and the solution is acidified to a pH of from 3.5 to 4 and retained in either glass or in copper, the activity of the invertase is not diminished to any appreciable extent. Expressed otherwise, the added agent prevents deterioration of the enzyme in the presence of acid and of metals.

That an invertase solution, which does not contain the protective agent, is materially affected by the addition of acid and when in the presence of a metal in acid solution, is exemplified by experiments which we have conducted. In the experiments an invertase solution acidified to a pH of 3.5 with hydrochloric acid and retained in glass gave a pH value of 0.206. The same solution retained in copper had an inverting value of $K=0.176$. When the solution was acidified to a pH value of 4.0 by the addition of hydrochloric acid, and retained in glass, the inverting value was $K=0.513$, and when retained in copper $K=0.483$. The solution without the addition of acid had a value of $K=0.721$. These experiments indicate that acid, and metals in the presence of acid, have a destructive action upon invertase.

The incorporation of the protective agent tends to hold the protein material in suspension, and accordingly it is desirable to allow the solution to stand for a period of time so that protein may precipitate more completely. Unless sufficient time is allowed for the precipitation of protein, the invertase solution upon further standing will become somewhat clouded because of a further separation.

It will be realized that the invention in its more general aspects is not limited to the specific quantities and conditions set forth in the foregoing description, but that these conditions and quantities may be modified without departing from the spirit and scope of the invention.

The killing of yeast may be accomplished with the use of other substances than toluene, e. g., benzene, xylenes, diethylene dioxide, glycerine, and like solvents, but we prefer to use toluene as it has been found to give excellent uniform results and is readily available. The autolysis of the yeast may be carried out without the addition of an alkaline reacting material, but the results obtained are improved and the processing facilitated by the use of such materials, e. g., sodium carbonate. Thus, the use of from 0.5 to 1% of sodium carbonate increases the activity of the invertase preparation to the extent of about 10%. Further, it materially shortens the time required for autolysis, that is, it reduces the period within which the yeast mass may be filtered to obtain an invertase containing filtrate. Without the use of sodium carbonate, 5 to 7 days may be required for the autolysis, but with the addition of sodium carbonate the mass may be filtered at the end of about 16 hours. This effect of sodium carbonate is believed not to be primarily associated with the pH value. We have found that autolysis proceeds for the production of invertase with a pH range of from 5.6 to 8.6. It appears that the optimum pH range is from 5.6 to 7.0. The reason for this optimum appears to be that if the yeast is too alkaline the invertase will be rapidly released, but the separation of the mass is very much impeded because of its gelatinous condition. Furthermore, the invertase preparation is darker in color when produced from yeast autolyzed under distinctly alkaline conditions. In addition to sodium carbonate other alkaline substances may be used, such as ammonia, sodium bicarbonate, diammonium hydrogen phosphate, disodium hydrogen phosphate, trisodium phosphate, potassium carbonate, potassium bicarbonate, etc. Of these various materials, however, it is preferred to use sodium carbonate because of the constancy of the results obtained through its utilization.

The preferred temperature of autolysis is about 30° C. This temperature may be varied from about 25°–35° C. However, below about 25° the autolytic action becomes so slow as to be substantially commercially impracticable and at times above 35° C. the invertase may be more or less inactivated. As a result of autolysis continuing for a period of several hours, the yeast mass becomes fluid. Usually this condition will result by permitting the mass to stand over night with or without the addition of a small amount of sodium carbonate. We have found it desirable, from the standpoint of ready separation by filtration, to allow the mass to remain for about 4 days. This will vary inasmuch as different lots of yeast will be found to undergo autolysis at different rates. However, during this period a marked liberation of invertase from the yeast will have taken place. It is not necessary that the yeast mass be diluted prior to filtration. It may be filtered by simply adding about 10% of kieselguhr and utilizing a plate and frame filter press. If a larger amount of kieselguhr is admixed, the mass becomes semi-solid and cannot readily be transferred to a filter press by means of a pump. The filtration too is very slow and a large portion of the invertase will remain in the filter cake. A portion of this may be removed by repressing, e. g., by forming into cakes and pressing these cakes in a press of the type used for pressing cotton seed oil.

It is more desirable and the process may be carried out more expeditiously by mixing the autolyzed yeast mass with about 70% of water, or of a filtrate from a previous filtration and about 20% of kieselguhr. Such a mixture can be readily filtered and the invertase remaining in the residue removed by further treatment, for example, in a countercurrent manner. We prefer, when proceeding in this manner, to make three successive filtrations of each lot of autolyzed yeast. In the first filtration the autolyzed yeast is mixed with about 20% of kieselguhr and about 70% of the filtrate derived from the second filtration of a previous operation. For this filtration there may be used a center feed filter press which forms a cake of about 1½" in thickness and which will require about three hours at 25–90 lbs. pressure. This first filtrate constitutes the crude invertase and is that filtrate which is admixed with a protective agent, then acidified and further treated to place it in proper form for marketing.

The filter cake produced in the first filtration is mixed with the filtrate resulting from the third filtration of a previous lot of autolyzed yeast in a quantity of about 70% of the original yeast. The admixture is then filtered under the aforesaid conditions and the filtrate obtained is used for mixing with a fresh batch of autolyzed yeast prior to filtering. The filter cake from the second filtration is mixed with water and then filtered. The filtrate thus obtained is used for mixing with the filter cake secured during the first filtration of a succeeding operation. The filter cake obtained from the third filtration is substantially completely exhausted of invertase and, accordingly, is rejected.

The treatment with a strong acid and with a decolorizing carbon removes a considerable portion of the yeast protein from the invertase solution, which greatly improves the clearness and gives a preparation of good color, i. e., colorless to amber, in which the clarity is in a large measure retained. The color of the preparation is also improved due to the adsorption of colored substances by the carbon. Further, the carbon acts as an adsorber for a goodly part of the yeast odor. The odor of the product may be further improved by adding a material which will serve to overcome any yeast odor e. g., vanillin, bourbonal, and others. These additions are made with the object of improving the odor rather than of imparting to the preparation a distinctive flavor.

The inverting activity of invertase produced in accordance with the method described herein may be determined by inoculating a 10% cane sugar solution at a constant temperature of about 20° C., and having a pH value of 4.6 with the invertase preparation, and measuring the polarization initially and after a period of about 4 to 5 hours. The rate of reaction constant K is calculated through use of the following formula.

$$K = \frac{1}{t} \log \frac{a}{a-x}$$

in which $t$ represents reaction time, $a$ rotation of the sugar solution initially and $a-x$ the rotation at the time $t$. When equal quantities are taken this constant measures the invertase strength or content thereof. Thus, it has been found that invertase produced in accordance with the foregoing procedure has the value $K=.25$ to $.8$.

The final acidity of the invertase solution per se may range from a pH of 3.5 to 6.5, preferably from about 4.5 to 6 and more particularly 5.1 and may be adjusted to such values by the addition of an antacid substance either as an insoluble, or as a soluble material. When an insoluble material is used, as calcium carbonate, it is added in excess; the reaction allowed to continue until the desired pH is reached, and the excess removed, e. g., by filtration. When a soluble antacid, as sodium bicarbonate, is used, the amount added will be that sufficient to adjust the solution to the proper conditions of acidity. Following the adjustment of acidity, the solution is aerated, as by passing a current of air therethrough, in order to remove the carbon dioxide. We have found such removal desirable even though a carbonate was not used in adjusting the acidity for the reason that carbon dioxide is evolved during the autolysis of the yeast, and hence the liquids or filtrates normally contain a considerable amount of this gas and may even be supersaturated therewith. Such a preparation, if placed in sealed containers without the removal of the $CO_2$, would develop appreciable pressure and the containers might be ruptured.

Since certain changes in carrying out the above method, and certain modifications in the composition which embody the invention may be made without departing from its scope, it is intended that all matter contained in the above description shall be interpreted as illustrative and not in a limiting sense.

What we claim and desire to secure by Letters Patent is:

1. In a method for the production of an invertase preparation which includes releasing invertase from yeast at a pH of about 5.6 to 8.6, separating solid from liquid, acidifying the liquid to a pH of 3.5 to 4.5 whereby protein material is precipitated, filtering and adjusting acidity of the filtrate to a pH value of 3.5 to 6.5 by addition of an antacid substance, the improvement which consists in further processing the liquid initially separated from solid in the presence of a heavy metal and including in said liquid a polyhydric organic compound which protects invertase from deteriorating effects of metals and of acids.

2. In a method for the production of an invertase preparation which includes releasing invertase from yeast at a pH of about 5.6 to 8.6, separating solid from liquid, acidifying the liquid to a pH of 3.5 to 4.5 whereby protein material is precipitated, filtering and adjusting acidity of the filtrate to a pH value of 3.5 to 6.5 by addition of an antacid substance, the improvement which consists in further processing the liquid initially separated from solid in the presence of a heavy metal and including in said liquid an agent selected from the group consisting of ethylene glycol, glycerine, cane sugar, mannitol and erythrol.

3. In a method for the production of an invertase preparation which includes releasing invertase from yeast at a pH of about 5.6 to 8.6, separating solid from liquid, acidifying the liquid to a pH of 3.5 to 4.5 whereby protein material is precipitated, filtering and adjusting acidity of the filtrate to a pH value of 3.5 to 6.5 by addition of an antacid substance, the improvement which consists in further processing the liquid initially separated from solid in the presence of a heavy metal and including in said liquid an agent which protects invertase from deteriorating effects of metals and of acids in an amount of from 20 to 70% based upon the final volume of the invertase preparation and selected from the group consisting of ethylene glycol, glycerine, cane sugar, mannitol and erythrol.

4. In a method for the production of an invertase preparation which includes releasing invertase from yeast at a pH of about 5.6 to 8.6, separating solid from liquid, acidifying the liquid to a pH of 3.5 to 4.5 whereby protein material is precipitated, filtering and adjusting acidity of the filtrate to a pH value of 3.5 to 6.5 by addition of an antacid substance, the improvement which consists in further processing the liquid initially separated from solid in the presence of a heavy metal and including in said liquid an agent which protects invertase from deteriorating effects of metals and of acids in an amount of about 50% based upon the final volume of the invertase preparation and selected from the group consisting of ethylene glycol, glycerine, cane sugar, mannitol and erythrol.

5. In a method for the production of an invertase preparation which includes releasing invertase from yeast at a pH of about 5.6 to 8.6, separating solid from liquid, acidifying the liquid to a pH of 3.5 to 4.5, whereby protein material is precipitated, filtering and adjusting acidity of the filtrate to a pH value of 3.5 to 6.5 by addition of an antacid substance, the improvement which consists in further processing the liquid initially separated from solid in the presence of a heavy metal with addition thereto of glycerine in an amount of about 50% based upon the final volume of the invertase preparation.

GLENNARD E. MILLER.
ROBERT F. LIGHT.